(12) United States Patent
Schneider

(10) Patent No.: US 9,340,276 B2
(45) Date of Patent: May 17, 2016

(54) POWER DRIVE UNIT AND AIRCRAFT CARGO COMPARTMENT FLOOR WITH POWER DRIVE UNITS

(71) Applicant: Airbus Operations GmbH, Hamburg (DE)

(72) Inventor: Uwe Schneider, Jork (DE)

(73) Assignee: Airbus Operations GmbH, Hamburg (DE)

( * ) Notice: Subject to any disclaimer, the term of this patent is extended or adjusted under 35 U.S.C. 154(b) by 14 days.

(21) Appl. No.: 14/296,585

(22) Filed: Jun. 5, 2014

(65) Prior Publication Data

US 2014/0367227 A1 Dec. 18, 2014

(30) Foreign Application Priority Data

Jun. 13, 2013 (EP) ..................................... 13171842

(51) Int. Cl.
| | | |
|---|---|---|
| *B65G 47/10* | (2006.01) | |
| *B64C 1/22* | (2006.01) | |
| *B64D 9/00* | (2006.01) | |
| *B64C 1/20* | (2006.01) | |
| *B65G 13/06* | (2006.01) | |
| *B65G 13/10* | (2006.01) | |

(52) U.S. Cl.
CPC ... *B64C 1/22* (2013.01); *B64C 1/20* (2013.01); *B64D 9/00* (2013.01); *B65G 13/06* (2013.01); *B64D 2009/006* (2013.01); *B65G 13/10* (2013.01); *Y02T 50/46* (2013.01)

(58) Field of Classification Search
USPC .............. 198/370.09, 370.1, 371.3, 782, 788; 193/35 MD; 244/118.1
See application file for complete search history.

(56) References Cited

U.S. PATENT DOCUMENTS

| | | | | |
|---|---|---|---|---|
| 4,792,037 A | * | 12/1988 | Huber | ........................... 198/788 |
| 4,949,837 A | | 8/1990 | Huber | |
| 5,048,672 A | * | 9/1991 | Sundseth | ....................... 198/782 |
| 6,340,083 B1 | * | 1/2002 | Zhou et al. | ............... 198/370.09 |
| 2013/0019712 A1 | * | 1/2013 | Murakami et al. | .............. 74/7 E |

FOREIGN PATENT DOCUMENTS

| | | |
|---|---|---|
| DE | 19720224 | 10/1998 |
| EP | 0355251 | 2/1990 |
| EP | 1527993 | 5/2005 |

OTHER PUBLICATIONS

European Search Report, Nov. 20, 2013.

* cited by examiner

*Primary Examiner* — Gene Crawford
*Assistant Examiner* — Lester Rushin
(74) *Attorney, Agent, or Firm* — Greer, Burns & Crain Ltd.

(57) ABSTRACT

A power drive unit, including a plurality of diagonal rollers arranged at a circumference around a central roller axis and each of the plurality of diagonal rollers having a respective diagonal roller axis, a first drive motor coupled to a roller carrier and configured to rotate the plurality of diagonal rollers around the central roller axis, and a second drive motor coupled to a gear carrier and configured to rotate each of the diagonal rollers around the respective diagonal roller axis. The diagonal roller axes are tilted by a common skew angle with respect to the central roller axis.

18 Claims, 2 Drawing Sheets

POWER DRIVE UNIT AND AIRCRAFT CARGO COMPARTMENT FLOOR WITH POWER DRIVE UNITS

CROSS-REFERENCES TO RELATED APPLICATIONS

This application claims benefit of and priority to the European patent application No. 13 171 842.1, filed Jun. 13, 2013, the entire disclosure of which is incorporated herein by way of reference.

BACKGROUND OF THE INVENTION

The present invention relates to a power drive unit and a cargo compartment floor, in particular in cargo compartments of aircraft for loading and unloading of containers.

Aircraft used for the transport of cargo usually have cargo doors at a side of the aircraft. A loader moves a container into the aircraft through one of the cargo doors. In an area in the vicinity of the door inside the aircraft motorized devices in the floor of the cargo hold are able to pull the container all the way in and then direct it to the final storage and transportation location, where it will be locked in place. The container is moved forwards or backwards by motorized rollers in the floor, the so-called power drive units (PDUs).

Especially in the area near the doors the containers will have to be moved in different directions: First perpendicular to the main axis of the aircraft from outside to the inside, and then along the axis of the aircraft to move the container further into the cargo hold. Usually, ball mats—such as ones known from the document EP 1 527 993 A1—made from steel balls are employed in this area onto which the containers may be temporarily set down so that differently oriented PDUs may be raised and lowered sequentially for the different transportation modes.

Due to the heavy weight of ball mats their use in aviation is generally undesirable. One approach for reducing the weight of ball mats in the cargo hold of an aircraft is using ball mats made from lighter materials, such as disclosed in document DE 197 20 224 A1.

Other solutions try to dispose with the need of using ball mats. For example, document EP 0 355 251 A1 discloses a roller drive component with separate coaxially and adjoiningly arranged rollers that may be driven in opposite rotation in order to force a container supported on the roller drive component to turn sideways on the roller drive component.

However, there is still a need for solutions that enable a cargo hold to be equipped with lighter and simpler components.

SUMMARY OF THE INVENTION

One idea is therefore to reduce the complexity and weight of cargo compartment floors, particularly in cargo hold regions where cargo has to be moved in different directions.

A first aspect of the disclosure is directed to a power drive unit, comprising a plurality of diagonal rollers arranged at a circumference around a central roller axis and each of the plurality of diagonal rollers having a respective diagonal roller axis, a first drive motor coupled to a roller carrier and configured to rotate the plurality of diagonal rollers around the central roller axis, and a second drive motor coupled to a gear carrier and configured to rotate each of the diagonal rollers around the respective diagonal roller axis. The diagonal roller axes are tilted by a common skew angle with respect to the central roller axis.

A second aspect of the disclosure is directed to a cargo compartment floor for an aircraft, comprising at least one PDU according to the first aspect of the disclosure.

A third aspect of the disclosure is directed to an aircraft, comprising a cargo compartment floor according to the second aspect of the disclosure.

The idea on which the present invention is based is to implement a power drive unit having multiple diagonal rollers arranged equidistantly on a circumference around a central roller axis. The roller axes of the multiple diagonal rollers are skewed at an angle with respect to the central roller axis, the diagonal roller lying on the circumference around the central roller axes. The multiple diagonal rollers may on one hand be driven by a first drive motor to revolve around the central roller axis. On the other hand, a second drive motor revolves each of the diagonal rollers around its own diagonal roller axis.

By adapting the turning speed and direction of the second drive motor to the turning speed and direction of the first drive motor, two distinct conveying motions may be realized with the power drive unit: In one case, the diagonal rollers may follow the movement of the central roller axis, thereby forming the surface of a (virtual) larger central roller which is able to convey a container sat on top of the power drive unit in the direction of movement of the central roller.

In another case, the diagonal rollers may revolve in opposite direction to the (virtual) larger central roller resulting in a cancellation of the conveying operation of the central roller in the direction of movement of the central roller. Simultaneously, by virtue of the diagonal roller axes being aligned at an angle with respect to the central roller axis, a sideways conveying motion parallel to the central roller axis may be realized with the opposite driving operation of the diagonal rollers with respect to the central roller.

Advantageously, the power drive unit may thus implement orthogonal conveying motions of an engaged ULD on top of the power drive unit without the need for the power drive unit itself to be rotated as a whole. Moreover, a single type of fixedly arranged power drive unit is sufficient to realize orthogonal cargo conveyance, just by adapting the drive control of the first and second drive motor with respect to turning speed and turning direction.

According to an embodiment of the PDU, the PDU may further comprise an epicyclic gearing having a sun gear coupled to the roller carrier, and planetary gears coupled to the gear carrier. According to a further embodiment of the PDU, the PDU may further comprise a plurality of bevel gears, each bevel gear being connected to respective ones of the diagonal roller axes and being in operative connection to the planetary gears. The epicyclic gearing with the respective sun, planetary and bevel gears enables a compact and reliable implementation of the torque transmission for both the diagonal roller axis as well as the central roller axis.

According to a further embodiment of the PDU, the common skew angle may be 45°. Such a skew angle advantageously enables similar turning speeds for the diagonal rollers in order to move an ULD on top of the rollers in orthogonal directions.

According to a further embodiment of the PDU, the first drive motor and the second drive motor may be configured to be operated in opposite turning directions. According to a further embodiment of the PDU, the turning speed of the second drive motor may be adaptable to the turning speed of the first drive motor. With the separate and adaptable operation of the first and second drive motors, the PDU may be driven to move an ULD on top of the diagonal rollers in any desired transfer direction.

According to a further embodiment of the PDU, the diagonal rollers may comprise rollers made from metal covered with a rubber overlay. This provides mechanical stability of the PDU along with sufficient grip of the rollers with regard to the bottom of containers made mostly from metal.

According to an embodiment of the cargo compartment floor, the cargo compartment floor may comprise a plurality of PDUs which are arranged in a matrix arrangement, the respective diagonal rollers protruding from the surface from the cargo compartment floor. This may have the advantage that the PDUs may be arranged according to the standardized dimensions of the ULDs to be held in the cargo bay so that for each position of a ULD on the cargo compartment floor the ULD may always be in contact with at least one PDU.

According to a further embodiment of the cargo compartment floor, the cargo compartment floor may further comprise a plurality of roller elements being arranged between the plurality of PDUs in a matrix arrangement. With passive roller elements being arranged between the active power drive units, the cargo compartment floor may be cheaper and less complex to implement.

According to an embodiment of the aircraft the cargo compartment floor may be located in a cargo loading area in the vicinity of a cargo load door of the aircraft. This area is a crucial area in loading and unloading ULDs where conveyance of ULDs in orthogonal direction is especially desirable.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1:
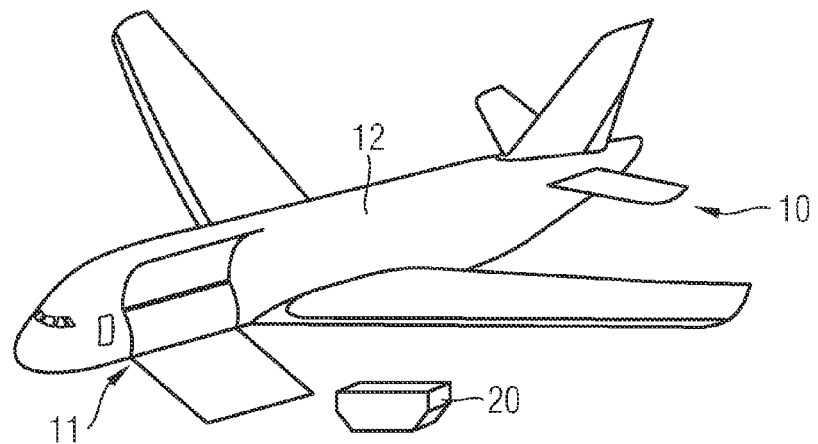
FIG. 1 schematically illustrates an aircraft being loaded with cargo according to an embodiment of the invention.

In the figures, like reference numerals denote like or functionally like components, unless indicated otherwise. Any directional terminology like "top", "bottom", "left", "right", "above", "below", "horizontal", "vertical", "back", "front", "clockwise", "counter-clockwise" and similar terms are merely used for explanatory purposes and are not intended to delimit the embodiments to the specific arrangements as shown in the drawings.

DETAILED DESCRIPTION OF THE PREFERRED EMBODIMENTS

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

FIG. 1 shows a schematic illustration of an aircraft 10 having a cargo bay 12. The aircraft 10 by way of example comprises a cargo load door 11 at one side of the fuselage structure of the aircraft 10. Through the cargo load door 11 cargo may be loaded into the cargo bay 12 of the aircraft 10 or unloaded from the cargo bay 12 of the aircraft 10.

Items to be shipped by air typically are loaded first onto specially configured pallets or into specially configured containers. In aviation, those various pallets and containers commonly are referred to as Unit Load Devices (ULDs). ULDs are available in various sizes and capacities, and are typically standardized in dimension and shape. A ULD—in the example of FIG. 1 a container 20—usually is loaded with cargo at a location other than the immediate vicinity of the aircraft 10. Once loaded with cargo items, the ULD is transferred to the aircraft, and is loaded onto the aircraft 10 through the cargo load door 11 using a conveyor ramp, scissor lift, or the like. Once inside the aircraft 10, the ULD is moved within the cargo compartment to its final stowage position. Multiple ULDs may be brought on-board the aircraft, with each ULD being placed in its respective stowage and transportation position in the cargo bay 12. After the aircraft 10 has reached its destination, the ULDs are unloaded from the aircraft 10 similarly, but in reverse sequence to the loading procedure.

To facilitate movement of a ULD within the cargo bay 12 the floor of the cargo bay 12 needs to include actively driven motorized roller components that engage with the bottom of the ULD. Particularly, in the vicinity of the cargo load door 11, roller components that may both move the ULD through the cargo load door 11 perpendicular to the main axis of the aircraft 10 and within the cargo bay 12 of the aircraft 10 parallel to the main axis of the aircraft 10 need to be employed.

Roller components which may be actively driven to convey a ULD on the cargo compartment floor are generally referred to as power drive units (PDUs). The ULDs sit atop the PDUs that enable rolling movement of the ULDs within the cargo bay 12. PDUs within the sense of the present invention may be any type of electrically powered rollers that can be selectively energized to propel or drive a ULD in a desired direction over the floor of a cargo bay 12 of an aircraft 10.

Figure 2:
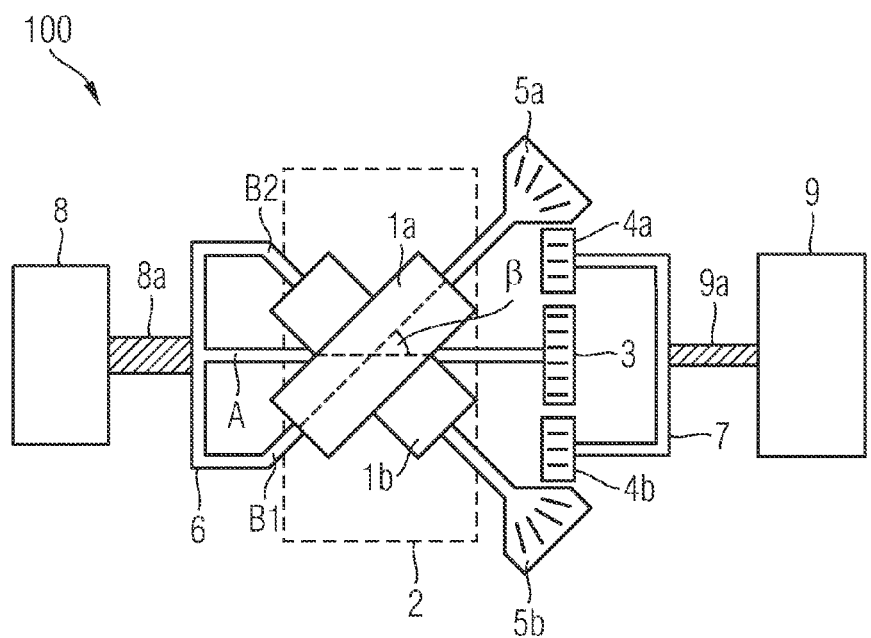
FIG. 2 schematically illustrates a power drive unit for a cargo compartment of an aircraft in top view according to a further embodiment of the invention.

FIG. 2 schematically shows a PDU 100 in top view according to an embodiment of the invention. The PDU 100 may for example be employed in cargo compartment floors of aircraft, such as the aircraft 10 of FIG. 1. In particular, the PDU 100 may be employed in cargo loading areas in the vicinity of a cargo load door, such as the cargo load door 11 of FIG. 1.

The PDU 100 comprises a plurality of diagonal rollers 1—of which exemplarily rollers 1a and 1b are shown in FIG. 2—arranged at a circumference around a central roller axis A. Each of the plurality of diagonal rollers 1a and 1b has a respective diagonal roller axis B1 and B2, respectively. The diagonal roller axes B1, B2 are tilted by a common skew angle $\beta$, for example 45°, with respect to the central roller axis A. The skew angle $\beta$ is chosen so that the diagonal roller axes B1, B2 are running parallel to a tangent of a virtual central roller 2 around the central roller axis A. The diagonal rollers 1a, 1b may for example comprise rollers made from rigid materials, such as metal, covered with elastomeric material, such as a rubber overlay.

Figure 3:
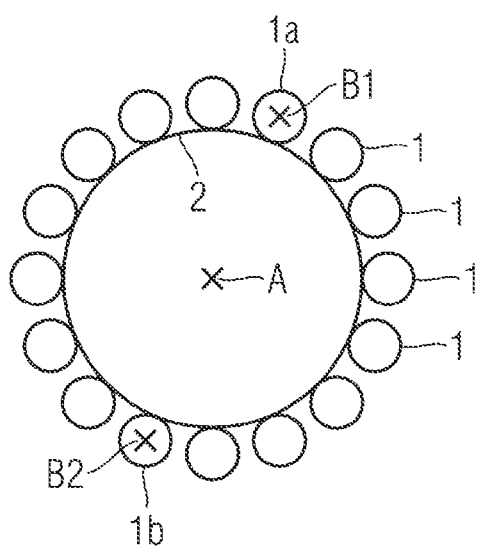
FIG. 3 schematically illustrates the power drive unit of FIG. 2 in cross section.

The arrangement of the diagonal rollers 1 along the circumference of the central roller 2 is schematically illustrated in cross section in FIG. 3. A number of diagonal rollers 1—in the example of FIG. 3 16 rollers 1—are oriented adjoiningly to each other and equidistantly to the central roller axis A. When revolving around the central roller axis A, the respective upper diagonal roller(s) 1 are gripping the bottom of an overlying ULD such that the ULD is driven in a desired direction by traction between the diagonal roller(s) 1 and the bottom of the ULD. The number of diagonal roller(s) 1 may be adapted to the circumference of the central roller 2 and may for example vary between two and 50 as needed for the specific application.

Returning to FIG. 1, the PDU 100 further comprises a first drive motor 8 coupled to a roller carrier 6 by means of a first drive shaft 8a. The roller carrier 6 generally has a number of prongs which is by one larger than the number of diagonal rollers 1. One of the prongs is a central extension along the central roller axis A, whereas the remaining prongs are guided out off-center from the central roller axis A and respectively angled according to the common skew angle β. Each of the angled prongs forms one of the diagonal roller axes B1, B2 for the plurality of diagonal rollers 1.

The first drive motor 8 may be configured to revolve around the central roller axis A, revolving all of the diagonal rollers 1 around the central roller axis A along the circumference of the central roller 2.

The PDU 100 may further comprise a second drive motor 9 which is coupled to a gear carrier 7. The gear carrier 7 includes a plurality of off-center prongs as well which are coupled to a plurality of planet gears 4a, 4b. The planet gears 4a, 4b form part of an epicyclic gearing with a sun gear 3 being centered on the central roller axis A and meshed with the planet gears 4a, 4b. The sun gear 3 is coupled to the central prong of the roller carrier 6.

The second drive motor 9 may be configured to rotate each of the diagonal rollers 1 around the respective diagonal roller axis B1, B2 by means of a plurality of bevel gears 5a and 5b which form an outer ring of the epicyclic gearing. The planet gears 4a, 4b may rotate relative to the sun gear on the gear carrier 7, thereby transferring torque to the bevel gears 5a, 5b meshed with the planet gears 4a, 4b. Each bevel gear 5a, 5b is connected to a respective one of the diagonal roller axes B1, B2. The bevel gears 5a, 5b may be beveled in accordance with the common skew angle β.

When the first drive motor 8 and the second drive motor 9 are moving in the same turning direction, the planet gears 4a, 4b and the sun gear 3 are revolving with the same speed, so that the diagonal rollers 1 stand still with respect to the central roller 2. In this first operation mode, any ULD on top of the PDU 100 will be solely transferred or propelled in the turning direction of the drive motors, i.e., perpendicular to the central roller axis 2.

However, when the first drive motor 8 and the second drive motor 9 are moving in opposite turning directions, the reverse revolving movement of the diagonal rollers 1 with respect to the revolving movement of the central roller 2 allows for a cancellation of the propulsion perpendicular to the central roller axis 2. Instead, due to the slanted arrangement of the diagonal rollers 1, the remaining transfer component of the diagonal rollers 1 points in a direction parallel to the central roller axis 2. In this second operation mode, a ULD on top of the PDU 100 will be solely transferred or propelled in the direction of the central roller axis 2, i.e., perpendicular to the transfer direction of the first operation mode.

In order to establish the second operation mode, the turning speed of the first and second drive motors 8 and 9 will have to be adapted to each other depending on the size and number of the diagonal rollers 1 as well as the radius of the central roller 2.

Figure 4:
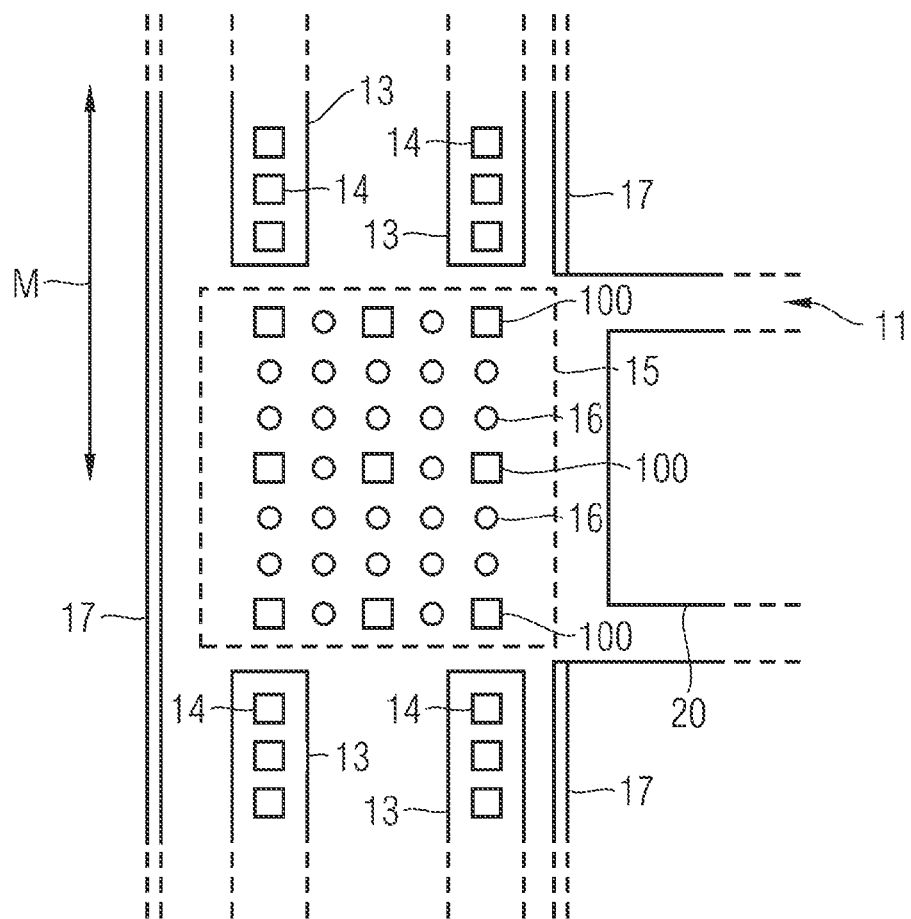
FIG. 4 schematically illustrates a cargo compartment floor for an aircraft having multiple power drive units according to a further embodiment of the invention.

FIG. 4 shows a schematical illustration of a part of a cargo bay of an aircraft, for example the cargo bay 12 of the aircraft 10 in FIG. 1. The aircraft is delimited by an aircraft hull 17 which opens on one side to a cargo load door 11. A container 20 is indicated as being loaded into the cargo bay.

A cargo compartment floor 15 is located in a cargo loading area in the vicinity of a cargo load door 11 of the aircraft. The cargo compartment floor 15 comprises a plurality of PDUs 100 which are generally arranged in a matrix arrangement, the respective diagonal rollers 1a and 1b of the PDUs 100 protruding from the surface from the cargo compartment floor 15 in order to engage with the bottom of the container 20 as it is guided onto the cargo compartment floor 15. The central roller axes A of the PDUs 100 are in the example FIG. 4 arranged to be parallel to the main axis M of the aircraft. Of course, other arrangements of the central roller axes A of the PDUs 100 with regard to the main axis M of the aircraft may be possible as well, for example a perpendicular arrangement of the central roller axes A of the PDUs 100 with regard to the main axis M of the aircraft.

A plurality of roller elements 16 may be arranged between the plurality of PDUs 100 in a matrix arrangement as well. The roller elements 16 may be passive elements, for example roller ball units that serve as stabilizing and guiding means for the container 20 as it is conveyed on the cargo compartment floor 15 by the PDUs 100.

The number of PDUs 100 and roller elements 16 is only exemplarily depicted in FIG. 4 and a different number and placement of the PDUs 100 and roller elements 16 may be chosen as well, depending on the respective application of the cargo compartment floor 15 in the aircraft. Moreover, the positioning of the PDUs 100 and roller elements 16 may deviate from the standard rectangular matrix arrangement as well and may be adapted to the outer shape of the cargo compartment floor 15, which does not necessarily need to be rectangular either.

The cargo compartment floor 15 is located between conveyor belts 13 have multiple conventional conveyor rollers 14 in order to convey containers 20 within the cargo bay parallel to the main axis M of the aircraft, once the container has been transferred from the cargo compartment floor 15 to the conveyor belts 13.

Having regard to FIGS. 2 and 3—and assuming that as an example the central roller axes A of the PDUs 100 are arranged to be parallel to the main axis M of the aircraft—at first the PDUs 100 are operated in the first operation mode where the first and second drive motors 8 and 9 are operated with the same turning speed and the same turning direction. In that mode the container 20 will get pulled in through the cargo load door 11 with the PDUs 100 propelling the container in a perpendicular direction to the main axis M of the aircraft.

When the container 20 is fully within the aircraft and ready to be stowed in the cargo bay 12, the PDUs 100 or at least part of the PDUs 100 may be operated in the second operation mode where the first drive motor 8 is operated in the opposite turning direction than the second drive motor 9, the turning speed of the second drive motor 9 being adapted to that of the first drive motor 8 in order to have the reverse movement of the diagonal rollers 1a, 1b around the diagonal roller axes B1, B2 cancel out the forward movement of the diagonal rollers around the central roller axis A. That way, the only remaining propelling movement of the container 20 rested atop the diagonal rollers will be directed sideways, i.e., in the direction of the main axis M of the aircraft. Thus, the container 20 may be moved onto the conveyor belts 13 for further transfer by the rollers 14 into the cargo bay 12 and the final stowage position in the aircraft.

The direction of the sideways movement may be controlled by reversing both turning directions of the first and second drive motors 8 and 9 in the second operation mode.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. In particular, the embodiments and configurations described for the composite reinforcement components and structural elements can be applied accordingly to the aircraft or spacecraft according to the invention and the method according to the invention, and vice versa.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A power drive unit, PDU, comprising:
   a plurality of diagonal rollers arranged at a circumference around a central roller axis and each of the plurality of diagonal rollers having a respective diagonal roller axis;
   a first drive motor coupled to a roller carrier and configured to rotate the plurality of diagonal rollers around the central roller axis;
   a second drive motor coupled to a gear carrier and configured to rotate each of the diagonal rollers around the respective diagonal roller axis;
   an epicyclic gearing having a sun gear coupled to the roller carrier, and planetary gears coupled to the gear carrier; and
   a plurality of bevel gears, each bevel gear being connected to respective ones of the diagonal roller axes and being in operative connection to the planetary gears,
   wherein the diagonal roller axes are tilted by a common skew angle with respect to the central roller axis.

2. A power drive unit, PDU, comprising:
   a plurality of diagonal rollers arranged at a circumference around a central roller axis and each of the plurality of diagonal rollers having a respective diagonal roller axis;
   a first drive motor coupled to a roller carrier and configured to rotate the plurality of diagonal rollers around the central roller axis; and
   a second drive motor coupled to a gear carrier and configured to rotate each of the diagonal rollers around the respective diagonal roller axis,
   wherein the diagonal roller axes are tilted by a common skew angle is 45° with respect to the central roller axis.

3. The PDU according to claim 1, wherein the first drive motor and the second drive motor are configured to be operated in opposite turning directions.

4. The PDU according to claim 3, wherein the turning speed of the second drive motor is adaptable to the turning speed of the first drive motor.

5. The PDU according to claim 1, wherein the diagonal rollers comprise rollers made from metal covered with a rubber overlay.

6. A cargo compartment floor of an aircraft comprising:
   a power drive unit, PDU, comprising:
   a plurality of diagonal rollers arranged at a circumference around a central roller axis and each of the plurality of diagonal rollers having a respective diagonal roller axis;
   a first drive motor coupled to a roller carrier and configured to rotate the plurality of diagonal rollers around the central roller axis;
   a second drive motor coupled to a gear carrier and configured to rotate each of the diagonal rollers around the respective diagonal roller axis;
   an epicyclic gearing having a sun gear coupled to the roller carrier, and planetary gears coupled to the gear carrier; and
   a plurality of bevel gears, each bevel gear being connected to respective ones of the diagonal roller axes and being in operative connection to the planetary gears,
   wherein the diagonal roller axes are tilted by a common skew angle with respect to the central roller axis.

7. The cargo compartment floor according to claim 6, comprising a plurality of PDUs which are arranged in a matrix arrangement, the respective diagonal rollers protruding from the surface from the cargo compartment floor.

8. The cargo compartment floor according to claim 7, further comprising a plurality of roller elements being arranged between the plurality of PDUs in a matrix arrangement.

9. An aircraft comprising a cargo compartment floor including a power drive unit, PDU, comprising:
   a plurality of diagonal rollers arranged at a circumference around a central roller axis and each of the plurality of diagonal rollers having a respective diagonal roller axis;
   a first drive motor coupled to a roller carrier and configured to rotate the plurality of diagonal rollers around the central roller axis;
   a second drive motor coupled to a gear carrier and configured to rotate each of the diagonal rollers around the respective diagonal roller axis;
   an epicyclic gearing having a sun gear coupled to the roller carrier, and planetary gears coupled to the gear carrier; and
   a plurality of bevel gears, each bevel gear being connected to respective ones of the diagonal roller axes and being in operative connection to the planetary gears,
   wherein the diagonal roller axes are tilted by a common skew angle with respect to the central roller axis.

10. The aircraft according to claim 9, wherein the cargo compartment floor is located in a cargo loading area in a vicinity of a cargo load door of the aircraft.

11. The PDU according to claim 2, wherein the first drive motor and the second drive motor are configured to be operated in opposite turning directions.

12. The PDU according to claim 11, wherein the turning speed of the second drive motor is adaptable to the turning speed of the first drive motor.

13. The PDU according to claim 2, wherein the diagonal rollers comprise rollers made from metal covered with a rubber overlay.

14. A cargo compartment floor of an aircraft comprising:
a power drive unit, PDU, comprising:
- a plurality of diagonal rollers arranged at a circumference around a central roller axis and each of the plurality of diagonal rollers having a respective diagonal roller axis;
- a first drive motor coupled to a roller carrier and configured to rotate the plurality of diagonal rollers around the central roller axis; and
- a second drive motor coupled to a gear carrier and configured to rotate each of the diagonal rollers around the respective diagonal roller axis;
- wherein the diagonal roller axes are tilted by a common skew angle of 45° with respect to the central roller axis.

15. The cargo compartment floor according to claim 14, comprising a plurality of PDUs which are arranged in a matrix arrangement, the respective diagonal rollers protruding from the surface from the cargo compartment floor.

16. The cargo compartment floor according to claim 15, further comprising a plurality of roller elements being arranged between the plurality of PDUs in a matrix arrangement.

17. An aircraft comprising a cargo compartment floor including a power drive unit, PDU, comprising:
- a plurality of diagonal rollers arranged at a circumference around a central roller axis and each of the plurality of diagonal rollers having a respective diagonal roller axis;
- a first drive motor coupled to a roller carrier and configured to rotate the plurality of diagonal rollers around the central roller axis; and
- a second drive motor coupled to a gear carrier and configured to rotate each of the diagonal rollers around the respective diagonal roller axis,
- wherein the diagonal roller axes are tilted by a common skew angle of 45° with respect to the central roller axis.

18. The aircraft according to claim 17, wherein the cargo compartment floor is located in a cargo loading area in a vicinity of a cargo load door of the aircraft.

* * * * *